United States Patent
Yu et al.

(10) Patent No.: US 11,194,196 B2
(45) Date of Patent: Dec. 7, 2021

(54) ARRAY SUBSTRATE AND LIQUID CRYSTAL DISPLAY PANEL

(71) Applicant: TCL CHINA STAR OPTOELECTRONICS TECHNOLOGY CO., LTD., Shenzhen (CN)

(72) Inventors: Yun Yu, Shenzhen (CN); Qingyong Zhu, Shenzhen (CN)

( * ) Notice: Subject to any disclaimer, the term of this patent is extended or adjusted under 35 U.S.C. 154(b) by 59 days.

(21) Appl. No.: 16/627,341

(22) PCT Filed: Dec. 26, 2019

(86) PCT No.: PCT/CN2019/128726
§ 371 (c)(1),
(2) Date: Dec. 30, 2019

(87) PCT Pub. No.: WO2021/120276
PCT Pub. Date: Jun. 24, 2021

(65) Prior Publication Data
US 2021/0191182 A1    Jun. 24, 2021

(30) Foreign Application Priority Data
Dec. 18, 2019   (CN) .......................... 201911312111.5

(51) Int. Cl.
*G02F 1/1345* (2006.01)
*G02F 1/1343* (2006.01)
*G02F 1/1362* (2006.01)

(52) U.S. Cl.
CPC .... *G02F 1/13452* (2013.01); *G02F 1/134309* (2013.01); *G02F 1/136222* (2021.01)

(58) Field of Classification Search
CPC ................................................. G02F 1/136227
See application file for complete search history.

(56) References Cited

U.S. PATENT DOCUMENTS

| | | | |
|---|---|---|---|
| 2015/0355516 A1* | 12/2015 | Imai | G02F 1/1337 349/123 |
| 2016/0048045 A1* | 2/2016 | Imai | H01L 27/127 349/123 |
| 2017/0038653 A1* | 2/2017 | Xu | H01L 29/78633 |
| 2018/0045993 A1 | 2/2018 | Miyamoto | |
| 2019/0094633 A1 | 3/2019 | Li et al. | |
| 2019/0094638 A1* | 3/2019 | Li | G02F 1/136227 |
| 2021/0149237 A1* | 5/2021 | Sim | G02F 1/136286 |

FOREIGN PATENT DOCUMENTS

| | | | | |
|---|---|---|---|---|
| CN | 107479292 A | * | 12/2017 | ....... G02F 1/136227 |
| CN | 107479292 A | | 12/2017 | |
| CN | 109116646 A | | 1/2019 | |

* cited by examiner

Primary Examiner — Alexander P Gross (57) ABSTRACT

The application provides an array substrate and a liquid crystal display panel. The array substrate includes a substrate, a driving circuit layer, a color resist layer, and a pixel electrode layer which are disposed in a stack. The color resist layer includes a flow guiding portion and a first via hole having an aperture diameter greater than a threshold. The flow guiding portion is connected to at least part of the first via hole and positioned on at least one of an inside and an outside of the first via hole, and a flow guiding surface of the flow guiding portion is connected to a part of an edge of the aperture of the first via hole. According to the present application, the shape of the aperture is changed so that an alignment liquid does not accumulate when flowing through.

20 Claims, 5 Drawing Sheets

ARRAY SUBSTRATE AND LIQUID CRYSTAL DISPLAY PANEL

FIELD OF INVENTION

The present application relates to the field of display technologies, and in particular, to an array substrate and a liquid crystal display panel.

BACKGROUND OF INVENTION

In liquid crystal display panels, an alignment film coating is usually made by inkjet printing, but because an array substrate has been etched with lines and holes, etc. before the alignment film is applied, a surface of the array substrate is complicated, and there is a certain distance between the droplet and droplet of the polyimide formed by the inkjet printing, which requires spreading and extending, and drying and curing to form a uniform film layer on the surface of the array substrate. The surface of the array substrate has a complicated topography, especially when there exist large holes, due to an effect of surface tension on the liquid, spreading and extending of the alignment film encounters large holes and cannot flow into the holes, but rather is accumulated around the holes, resulting in thicker film thickness around the holes and abnormalities such as display unevenness (Mura) appear.

Therefore, the conventional liquid crystal display panel has a technical problem that it is easy to accumulate around the via hole when the alignment film flows, which needs to be improved.

SUMMARY OF INVENTION

Technical Problem

The present application provides an array substrate and a liquid crystal display panel to alleviate the technical problem that an alignment film in the conventional liquid crystal display panel is easy to accumulate around the via hole when the alignment film flows.

Technical Solutions

To solve the above problems, the technical solutions provided in the present application are as follows.

The present application provides an array substrate, including:
a substrate;
a driving circuit layer formed on a side of the substrate;
a color resist layer formed on a side of the driving circuit layer away from the substrate, and a plurality of via holes formed in the color resist layer; and
a pixel electrode layer formed on a side of the color resist layer away from the driving circuit layer, and the pixel electrode layer connected to the driving circuit layer through the via holes;
wherein the via holes include at least one first via hole having an aperture diameter greater than a threshold value, the color resist layer is further formed with a plurality of flow guiding portions, each of the flow guiding portions is connected to at least part of the first via hole and positioned on at least one of an inside and an outside of the first via hole, the first via hole includes an aperture close to a side of the pixel electrode layer, each of the flow guiding portions includes a flow guiding surface flush with the aperture, and the flow guiding surface is connected to a part of an edge of the aperture.

In the array substrate of the present application, the first via hole is connected to at least one of the flow guiding portions.

In the array substrate of the present application, one of the flow guiding portions is formed on the outside of the first via hole, and the flow guiding portion is groove.

In the array substrate of the present application, one of the flow guiding portions is formed on the inside of the first via hole, and the flow guiding portion is a solid structure.

In the array substrate of the present application, the solid structure is integrally formed with the color resist layer.

In the array substrate of the present application, each of the flow guiding portions includes a first flow guiding portion formed on the outside of the first via hole and a second flow guiding portion formed on the inside of the first via hole, and the first guiding portion is a groove, and the second guiding portion is a solid structure.

In the array substrate of the present application, the solid structure is integrally formed with the color resist layer.

In the array substrate of the present application, a shape of the flow guiding surface includes at least one of a triangle, a circular arc, a rectangle, or a trapezoid.

In the array substrate of the present application, a depth of each of the flow guiding portions is less than or equal to a thickness of the color resist layer.

In the array substrate of the present application, a cross section of the flow guiding portions includes a first side edge and a second side edge, the first side edge is connected to a side wall of the first via hole, the second side edge is far away from the side wall of the first via hole, and the second side edge is a beveled or stepped structure.

The present application further provides a liquid crystal display panel including a first substrate and a second substrate arranged to a cell, and a liquid crystal filled between the first substrate and the second substrate, the first substrate including:
a substrate;
a driving circuit layer formed on a side of the substrate;
a color resist layer formed on a side of the driving circuit layer away from the substrate, and a plurality of via holes formed in the color resist layer; and
a pixel electrode layer formed on a side of the color resist layer away from the driving circuit layer, and the pixel electrode layer connected to the driving circuit layer through the via holes;
wherein the via holes include at least one first via hole having an aperture diameter greater than a threshold value, and the color resist layer is further formed with a plurality of flow guiding portions, each of the flow guiding portions is connected to at least part of the first via hole and positioned on at least one of an inside and an outside of the first via hole, the first via hole includes an aperture close to a side of the pixel electrode layer, each of the flow guiding portions includes a flow guiding surface flush with the aperture, and the flow guiding surface is connected to a part of an edge of the aperture.

In the liquid crystal display panel of the present application, the first via hole is connected to at least one of the flow guiding portions.

In the liquid crystal display panel of the present application, one of the flow guiding portions is formed on the outside of the first via hole, and the flow guiding portion is groove.

In the liquid crystal display panel of the present application, one of the flow guiding portions is formed on the inside of the first via hole, and the flow guiding portion is a solid structure.

In the liquid crystal display panel of the present application, the solid structure is integrally formed with the color resist layer.

In the liquid crystal display panel of the present application, each of the flow guiding portions includes a first flow guiding portion formed on the outside of the first via hole and a second flow guiding portion formed on the inside of the first via hole, and the first guiding portion is a groove, and the second guiding portion is a solid structure.

In the liquid crystal display panel of the present application, the solid structure is integrally formed with the color resist layer.

In the liquid crystal display panel of the present application, a shape of the flow guiding surface includes at least one of a triangle, a circular arc, a rectangle, or a trapezoid.

In the liquid crystal display panel of the present application, a depth of each of the flow guiding portions is less than or equal to a thickness of the color resist layer.

In the liquid crystal display panel of the present application, a cross section of the flow guiding portions includes a first side edge and a second side edge, the first side edge is connected to a side wall of the first via hole, the second side edge is far away from the side wall of the first via hole, and the second side edge is a beveled or stepped structure.

Beneficial Effect

Advantageous effects of the present application are as follows. The present application provides an array substrate and a liquid crystal display panel, which the array substrate includes a substrate, a driving circuit layer, a color resist layer, and a pixel electrode layer. The driving circuit layer is formed on a side of the substrate. The color resist layer is formed on a side of the driving circuit layer away from the substrate, and a plurality of via holes are formed in the color resist layer. The pixel electrode layer is formed on a side of the color resist layer away from the driving circuit layer, and the pixel electrode layer is connected to the driving circuit layer through the via holes, wherein the via holes include at least one first via hole having an aperture diameter greater than a threshold value, the color resist layer is further formed with a plurality of flow guiding portions, each of the flow guiding portions is connected to at least part of the first via hole and positioned on at least one of an inside and an outside of the first via hole, the first via hole includes an aperture close to a side of the pixel electrode layer, each of the flow guiding portions includes a flow guiding surface flush with the aperture, and the flow guiding surface is connected to a part of an edge of the aperture. By providing the flow guiding portion, the flow guiding surface of the flow guiding portion is connected to the aperture of the first via hole, so that a shape of the aperture is changed. When the subsequent alignment liquid flows through the first via hole, a flow direction will be changed, which reduces the phenomenon that the alignment liquid bypasses the first via hole. Moreover, the additional pressure of the alignment liquid increases, so it does not accumulate around the first via hole, so that the film thickness of the alignment film on the array substrate is relatively uniform.

BRIEF DESCRIPTION OF FIGURES

The following detailed description of specific embodiments of the present application will make the technical solutions and other beneficial effects of the present application obvious in conjunction with the drawings.

DETAILED DESCRIPTION OF EMBODIMENTS

The present application provides a liquid crystal display panel, a method for manufacturing the same, and a manufacturing system. In order to make the purpose, technical solution, and effect of the present application clearer and more specific, the following further describes the present application with reference to the accompanying drawings and examples. It should be understood that the specific embodiments described herein are merely used to explain the application, and are not used to limit the application.

The present application provides an array substrate and a liquid crystal display panel to alleviate the technical problem that an alignment film in the conventional liquid crystal display panel is easy to accumulate around a via hole when the alignment film flows.

Figure 1:
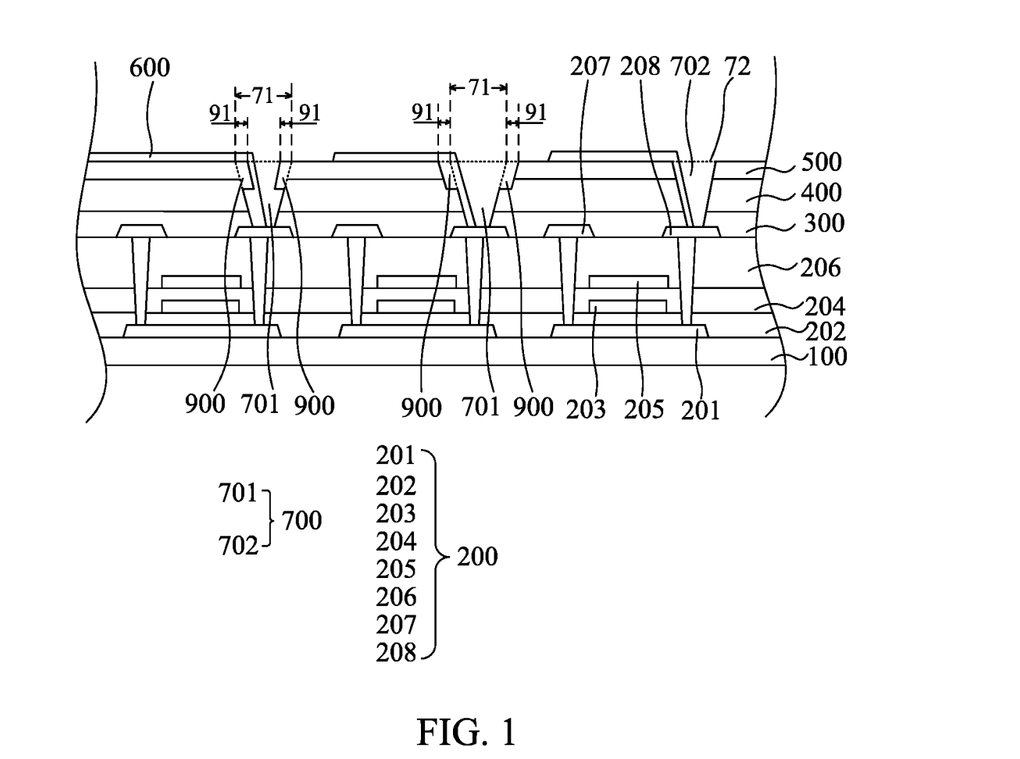
FIG. 1 is a schematic diagram of a first structure of an array substrate according to an embodiment of the present application.

As shown in FIG. 1, it is a schematic diagram of a first structure of an array substrate according to an embodiment of the present application. The array substrate includes a substrate 100, a driving circuit layer 200, a color resist layer 400, and a pixel electrode layer. The driving circuit layer 200 is formed on a side of the substrate 100, the color resist layer 400 is formed on a side of the driving circuit layer 200 away from the substrate 100, and a plurality of via holes 700 are formed in the color resist layer 400. A pixel electrode layer is formed on a side of the color resist layer 400 away from the driving circuit layer 200, and the pixel electrode layer is connected to the driving circuit layer 200 through the via holes 700. Meanwhile, the via holes 700 include at least one first via hole 701 having an aperture diameter greater than a threshold value, and the color resist layer 700 is further formed with a plurality of flow guiding portions 900, each of the flow guiding portions 900 is connected to at least part of the first via hole 701 and positioned on at least one of an inside and an outside of the first via hole, the first via hole 701 includes an aperture 71 close to a side of the pixel electrode layer, each of the flow guiding portions 900 includes a flow guiding surface 91 flush with the aperture 71, and the flow guiding surface 91 is connected to a part of an edge of the aperture 71.

The substrate 100 can be a rigid substrate such as glass and transparent resin, etc., or a flexible substrate such as polyimide, polycarbonate, polyethersulfone, polyethylene terephthalate, and polynaphthalene. The material of the substrate 100 is not limited in the present application, such as ethylene glycol formate, polyarylate, or glass fiber reinforced plastic.

The driving circuit layer 200 is formed on the side of the substrate 100 and includes a plurality of thin film transistors. Taking a bottom-gate thin film transistor as an example, the thin film transistor includes an active layer 201, a first gate insulating layer 202, a first metal layer 203, a second gate insulating layer 204, a second metal layer 205, an interlayer dielectric layer 206, and a source-drain layer which are stacked on the substrate 100.

A buffer layer (not shown) is usually formed on the substrate 100, and the material of the buffer layer can be an inorganic material such as silicon oxide or silicon nitride.

The active layer 201 is formed on the buffer layer. The material of the active layer 201 is a metal oxide, such as indium gallium zinc oxide (IGZO), but it is not limited to this. It can also be one or more of aluminum zinc oxide (AZO), indium zinc oxide (IZO), zinc oxide (ZnO), indium oxide (In2O3), boron-doped zinc oxide (BZO), and magnesium-doped zinc oxide (MZO). In addition, the active layer 201 can also be a polysilicon material or other materials.

The first gate insulating layer 202 is formed on the active layer. The material of the first gate insulating layer 202 can be an inorganic material such as silicon oxide or silicon nitride.

The first metal layer 203 is formed on the first gate insulating layer 202. The material of the first metal layer 203 can be molybdenum, aluminum, or copper, but is not limited thereto, and can also be chromium, tungsten, titanium, tantalum, or alloys containing a combination thereof, and the material is not particularly limited herein. The first metal layer 203 is patterned through an etching process to form a gate of each thin film transistor, a first electrode plate of a storage capacitor, and scan lines.

The second gate insulating layer 204 is formed on the first metal layer 203. The material of the second gate insulating layer 204 can be an inorganic material such as silicon oxide or silicon nitride.

The second metal layer 205 is formed on the second gate insulating layer 204. The material of the second metal layer 205 can be molybdenum, aluminum, or copper, but is not limited thereto, and can also be chromium, tungsten, titanium, tantalum, or alloys containing a combination thereof, and the material is not particularly limited herein. The second metal layer 205 is patterned to form a second electrode plate of the storage capacitor.

The interlayer dielectric layer 206 is formed on the second metal layer 205. The material of the interlayer dielectric layer 206 can be an inorganic material such as silicon oxide or silicon nitride.

The source-drain layer is formed on the interlayer dielectric layer 206. The material of the source-drain layer can be molybdenum, aluminum, or copper, but is not limited thereto, and can also be chromium, tungsten, titanium, tantalum, or alloys containing a combination thereof. The source-drain layer is patterned through an etching process to form a source electrode 207 and a drain electrode 208 of each thin film transistor, and data lines. The source electrode 207 and the drain electrode 208 are connected to the active layer 201 through a third via.

The color resist layer 400 is formed on the driving circuit layer 200. The color resist layer 400 includes three color resists of red, green, and blue arranged in sequence. The via holes 700 are formed in the color resist layer 400. In an embodiment, a first passivation layer 300 and a second passivation layer 500 are further formed on upper and lower sides of the color resist layer 400, respectively. The materials of the first passivation layer 300 and the second passivation layer 500 can be at least one of silicon oxide and silicon nitride, in the meantime, the via holes 700 penetrate the first passivation layer 300 and the second passivation layer 500.

The description of the structure of each film layer in the driving circuit layer is based on a bottom-gate thin film transistor. Of course, the structure of the driving circuit layer 200 is not limited thereto, and a top-gate thin film transistor can also be included.

A pixel electrode layer is formed on the driving circuit layer 200. The pixel electrode layer includes a plurality of pixel electrodes 600 arranged in an array and independent of each other. The pixel electrodes 600 are connected to the drain electrodes 208 of the thin film transistors through the via holes 700.

The via holes 700 include the first via hole 701 having the aperture diameter greater than the threshold value and a second via hole 702 having an aperture diameter not greater than the threshold value. A shape of the via holes 700 is circle or approximately circle. Of course, the via holes 700 can also include only the first via hole 701, where the aperture refers to a critical dimension (CD) of the via holes 700, and the threshold value can be designed according to actual needs.

After the pixel electrode layer is fabricated, an inkjet printing method is used to form an alignment film on the pixel electrode layer. The material of the alignment film is usually polyimide, which is a spherical crown-shaped droplet when sprayed onto the array substrate. Due to the array substrate has been etched with lines and holes, etc. before the polyimide is printed, the topography is complicated, and there is a certain distance (about 50 to 200 um) between the droplet and droplet of the polyimide formed by the inkjet printing, which requires spreading and extending, and drying and curing to form a uniform alignment film on the surface of the array substrate. The surface of the array substrate has a complicated topography, especially there are via holes 700 of various sizes in the color resist layer 400. Because the polyimide droplets are subject to the effect of surface tension, when encountering a via hole with a larger aperture, they will flow around and cannot flow into the via hole 700, but will accumulate around the via hole 700, resulting in thicker film thickness around the via hole 700 and abnormalities such as display unevenness (Mura) appear.

For different coating materials and their concentrations, and different process equipment or parameters, etc., the corresponding thresholds will be different. The higher the concentration of the material, the greater the viscosity, and the higher the risk of flowing around. Therefore, it can be calculated and analyzed that the via holes 700 with a CD exceeding a certain size will appear the phenomenon of the alignment liquid flowing around, and this size is used as the threshold.

Figure 2:
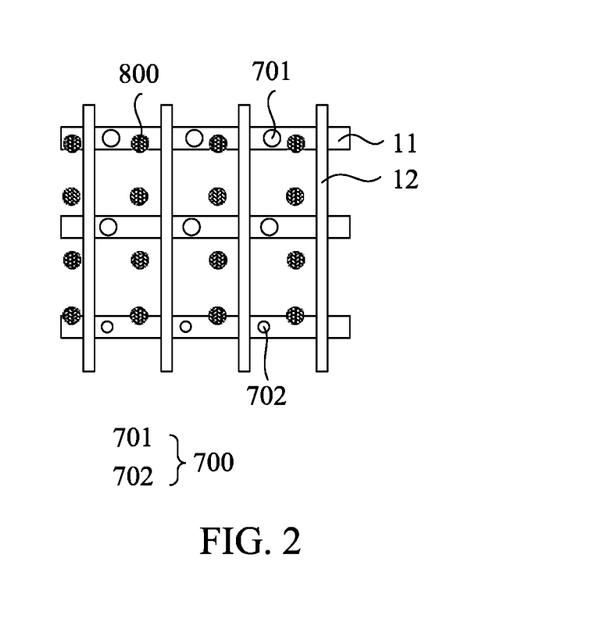
FIG. 2 is a schematic plane view of an array substrate in the conventional art.
Figure 3:
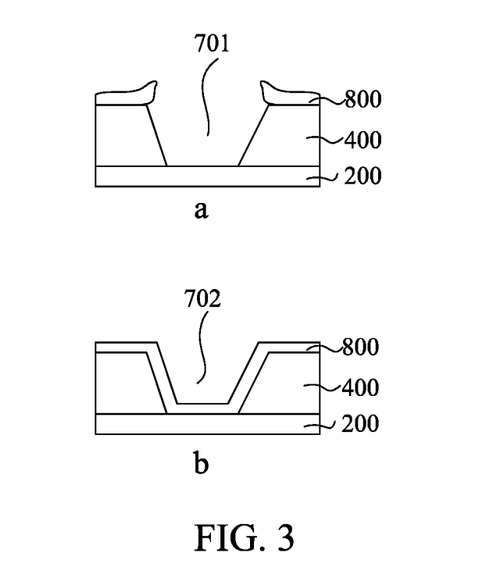
FIG. 3 is a schematic diagram of a state where an alignment film in an array substrate flows through a via hole in a color resist layer in the conventional art.

As shown in FIG. 2, the scan lines 11, the data lines 12, and the via holes 700 are formed in the array substrate. The via holes 700 include at least one first via hole 701 having the aperture diameter greater than the threshold value and at least one second via hole 702 having an aperture diameter not greater than the threshold value. After an alignment liquid 800 sprayed on the array substrate to form a plurality of droplets. As shown in FIG. 3 with label a, when the first via hole 701 is encountered, the alignment film 800 flows around the hole and accumulates, and cannot flow into the first via hole 701. As shown in FIG. 3 with label b, the alignment film 800 can flow into the hole when the second via hole 702 is encountered, and there will be no accumulation.

Figure 4:
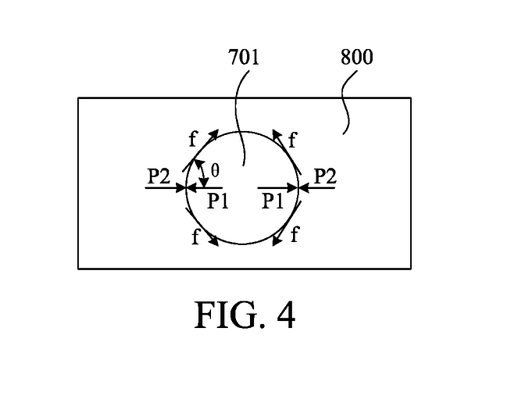
FIG. 4 is a schematic diagram of a stress condition of the alignment film when the alignment film flows around a first via hole in the conventional art.

As shown in FIG. 4, it is a schematic diagram of a stress condition of an alignment film 800 when the alignment film 800 flows around a first via hole 701 in the conventional art. When the alignment film 800 encountered the first via hole 701, it has a concave liquid surface. The surface tension f of the alignment film 800 is along a tangential direction of the first via hole 701, so it tends to flow around the first via hole 701. At the same time, air will generate atmospheric pressure P1 on the concave liquid surface of the alignment film 800, and surface tension f will generate additional pressure P2, where P1 is directed to the outside from a center of the first via hole 701 and P2 is directed to the center from the outside of the first via hole 701.

There are various reasons why the alignment film 800 does not easily flow into the first via hole 701. In one aspect, the first via hole 701 has a circular aperture, and the surface tension f is along the tangential direction of the first via hole 701, so it tends to flow around the first via hole 701 instead of directly flowing into. In another aspect, the additional pressure P2 is too small. According to Young Laplace's equation, it can be known that when P1>P2, that is, when the pressure on an air side is larger, a total pressure on the liquid Ps=P2−P1<0, a direction of Ps is directed to the concave liquid surface from the center, and the alignment film 800 does not easily flow into the hole.

There are two factors affecting the additional pressure P2. Firstly, an angle between the surface tension f and the additional pressure P2 is θ. When the angle θ is larger, the smaller the additional pressure P2 is, the more difficult it is for the alignment film 800 to flow into the first via hole 700. Secondly, the larger the aperture diameter of the first via hole 700 is, the smaller the additional pressure P2 caused by the surface tension f is, and the less likely the alignment film 800 flows into the first via hole 700. Therefore, the additional pressure P2 needs to be increased, and the inflow of the alignment film 800 can be facilitated when the additional pressure P2 is greater than the atmospheric pressure P1.

Figure 5:
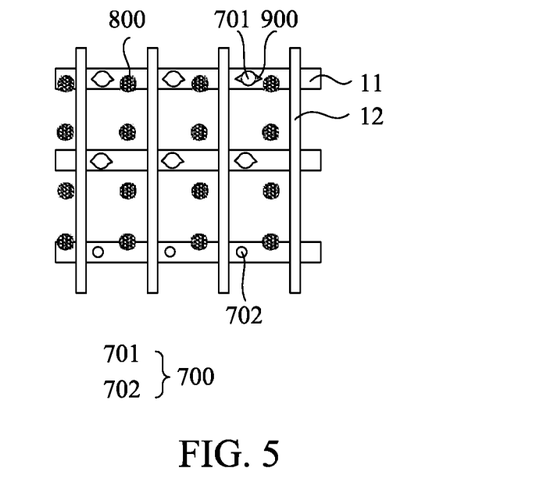
FIG. 5 is a schematic plane view of an array substrate according to an embodiment of the present application.

Based on the foregoing reasons, in the embodiments of the present application, as shown in FIG. 1 and FIG. 5, a plurality of flow guiding portions 900 are further formed in the color resist layer 700, and each of the flow guiding portions 900 is connected to at least part of the first via hole 701 and positioned on at least one of the inside and the outside of the first via hole 701, that is, among all the first via holes 701 in the array substrate, a part of the first via holes 701 can be connected to the flow guiding portions 900, or all of the first via holes 701 are all connected to the flow guiding portions 900, respectively.

As shown in FIG. 1, the first via hole 701 includes an aperture 71 close to a side of the pixel electrode layer, each of the flow guiding portions 900 includes a flow guiding surface 91 flush with the aperture 71, and the flow guiding surface 91 is connected to a part of the edge of the aperture 71.

In an embodiment, as shown in a second first via hole 701 from left to right in FIG. 1, the flow guiding portion 900 is formed outside the first via hole 701, and the flow guiding portion 900 is a groove. At this time, the flow guiding surface 91 of the flow guiding portion 900 is an opening of the groove, and the circular aperture 71 is connected to the opening of the groove, which is equivalent to forming a protrusion on the circular aperture 71, and the whole of the aperture 71 and the opening is no longer circle, so when the alignment liquid flows there, the flow direction will change and will not flow around. In addition, when the angle θ decreases, the additional pressure P2 increases, so that the alignment film 800 easily flows into the first via hole 701.

In an embodiment, as shown in the first via hole 701 from left to right in FIG. 1, the flow guiding portion 900 is formed on the inside of the first via hole 701, and the flow guiding portion 900 is a solid structure. At this time, the flow guiding surface 91 of the flow guiding portion 900 is a top surface of the solid structure, and the circular aperture 71 is connected to the top surface of the solid structure, which is equivalent to the formation of a recession in the circular aperture 71. The whole of the aperture and the top surface is no longer circle, so when the alignment liquid flows there, the flow direction will change and will not flow around. At the same time, the existence of the recession reduces the aperture diameter of the overall opening, so the additional pressure P2 increases, and the alignment film 800 also flows into the first via hole 701 more easily.

In an embodiment, the solid structure is integrally formed with the color resist layer 400, that is, when the first via hole 701 is fabricated, a protrusion is directly formed in the color resist layer 400, and the protrusion enters the first via hole 701 to form a recession. Such fabrication is relatively simple and easy to process. Compared with the groove provided on the outside, a space occupied by the solid structure inside the array substrate is smaller, which benefits to increase a pixel aperture ratio.

In an embodiment, the solid structure and the color resist layer 400 are independent structures. After the first via hole 701 having the circular aperture is fabricated, a side wall of the first via hole 701 is modified to make the flow guiding portion 900 for the solid structure.

In an embodiment, the flow guiding portion 900 includes a first flow guiding portion formed outside the first via hole 701 and a second flow guiding portion formed on the inside of the first via hole 701. The first flow guiding portion is a groove and the second flow guiding portion is a solid structure. Through the combination, an overall opening shape of the first via hole 701 and the flow guiding portion 900 is changed to be larger, so the flowing around phenomenon is further alleviated. At the same time, the angle θ and the aperture are reduced, and the additional pressure P2 is increased more. Therefore, the alignment film 800 also flows into the first via hole 701 more easily.

In the present application, the flow guiding portion 900 is provided. The flow guiding surface 91 of the flow guiding portion 900 is connected to the aperture 71 of the first via hole 701, so that the shape of the aperture 71 is changed. When the subsequent alignment liquid flows through the first via hole 701, the flow direction will be changed, alleviating the phenomenon that the alignment liquid bypasses the first via hole 701, and the additional pressure of the alignment liquid increases, so it will not accumulate around the first via hole 701. Therefore, a film thickness of the alignment film 800 on the array substrate is more uniform.

Figure 6:
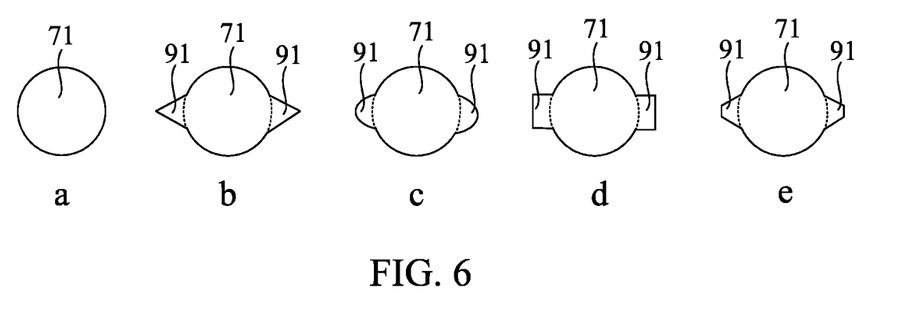
FIG. 6 is a first schematic plane diagram showing a comparison of an array substrate without a flow guiding portion and with a flow guiding portion according to an embodiment of the present application.

The shape of the flow guiding surface 91 can have various shapes. In an embodiment, when the flow guiding portion 900 is formed outside the first via hole 701. As shown in FIG. 6 with label a, it is a schematic diagram of the shape of the aperture 71 of the first via hole 701, the shape of the aperture 71 is circle or approximately circle. As shown in FIG. 6 with labels b to e, which respectively illustrate the overall aperture shape formed by the first via hole 701 and the flow guiding portion 900. The flow guiding surface 91 is connected to a part of the edge of the aperture 71, and a shape of the flow guiding surface 91 is at least one of a triangle, a circular arc, a rectangle, or a trapezoid.

Figure 7:
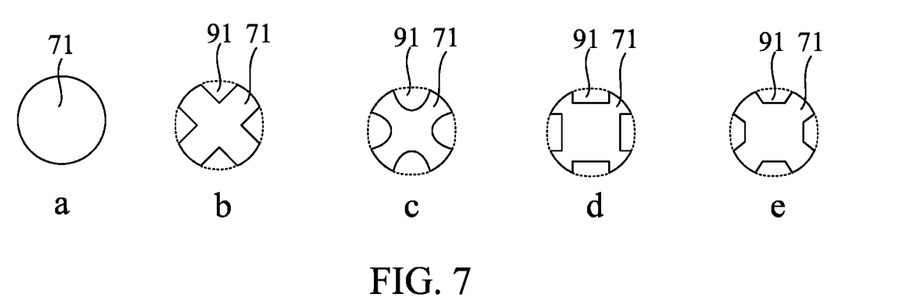
FIG. 7 is a second schematic plane diagram showing a comparison of an array substrate without a flow guiding portion and with a flow guiding portion according to another embodiment of the present application.

In an embodiment, when the flow guiding portion 900 is formed outside the first via hole 701, as shown in FIG. 7 with label a, it is a schematic diagram of the shape of the aperture 71 of the first via hole 701, and the shape of the aperture 71 is circle or approximately circle. As shown in FIG. 7 with labels b to e, which respectively illustrate the overall aperture shape formed by the first via hole 701 and the flow guiding portion 900. The flow guiding surface 91 is connected to a part of the edge of the aperture 71, and a shape of the flow guiding surface 91 is at least one of a triangle, a circular arc, a rectangle, or a trapezoid.

Figure 8:
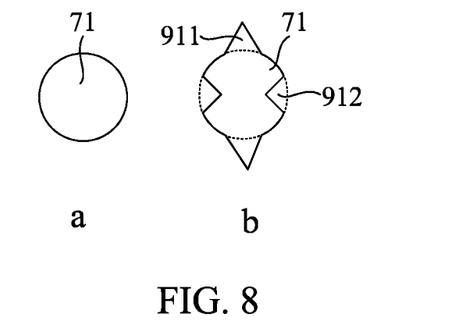
FIG. 8 is a third schematic plane diagram showing a comparison of an array substrate without a flow guiding portion and with a flow guiding portion according to yet another embodiment of the present application.

In an embodiment, when the flow guiding portion 900 includes a first flow guiding portion formed outside the first via hole 701 and a second flow guiding portion formed outside the first via hole 702. As shown in FIG. 8 with label a, it is a schematic diagram of the shape of the aperture 71 of the first via hole 701. The shape of the aperture 71 is circle or approximately circle. As shown in FIG. 8 with label b, which illustrates the overall aperture shape formed by the first via hole 701 and the flow guiding portion 900. The flow guiding surface 91 is connected to a part of the edge of the aperture 71, and a shape of the flow guiding surface 91 is at least one of a triangle, a circular arc, a rectangle, or a trapezoid. A shape of the first flow guiding surface 911 of the first flow guiding portion and a shape of the second flow guiding surface 912 of the second flow guiding portion can be the same or different.

Figure 9:
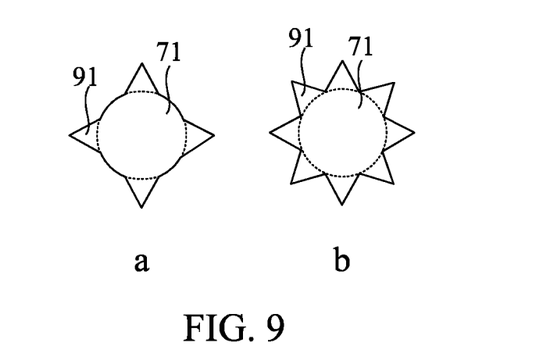
FIG. 9 is a schematic top plane view of an entire flow guiding portion and a first via hole in an array substrate according to an embodiment of the present application.

In the above-mentioned embodiments, each of the first via holes 701 can be connected to one flow guiding portion 900, or can be connected to a plurality of flow guiding portions 900. As shown in FIG. 9 with label a, one aperture 71 is connected to four flow guiding surfaces 91, that is, one aperture 71 forms four protrusions correspondingly. As shown in FIG. 9 with label b, one aperture 71 is connected to eight flow guiding surfaces 91, that is, one aperture 71 forms eight protrusions correspondingly. Of course, the present application is not limited thereto, and any number of the flow guiding portions 900 can be formed. The plurality of flow guiding portions 900 can be provided on the inside of the first via hole 701, that is, they are all solid structures, or they can be provided on the outside of the first via hole 701, that is, they are all grooves, or part of them can be provided on the inside of the first via hole 701, another part is provided on the outside of the first via hole 701, that is, the solid structure and the groove are used together. Designers in the field can reasonably set the number and positions of the flow guiding portions 900 according to the structure of the array substrate, the coating material and its concentration, the process equipment, and other factors to achieve a better flow guiding effect.

Figure 10:
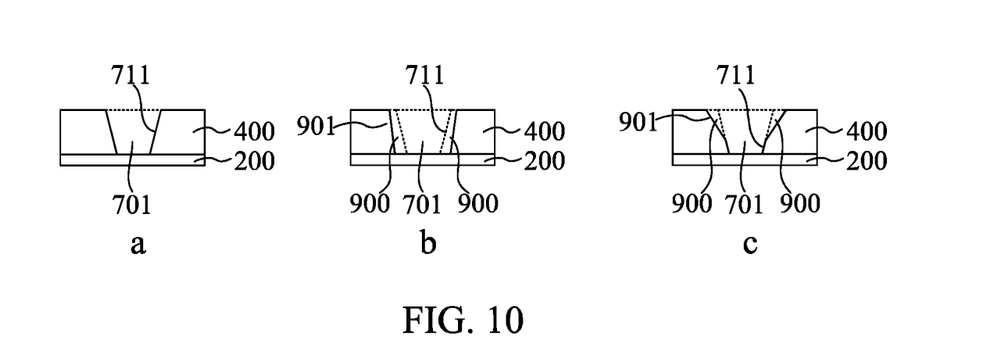
FIG. 10 is a first cross-sectional schematic diagram showing a comparison of an array substrate without a flow guiding portion and with a flow guiding portion according to an embodiment of the present application.

There can be various cross-sectional shapes of the flow guiding portion 900. In an embodiment, as shown in FIG. 10, it is a first cross-sectional schematic diagram showing a comparison of the array substrate without the flow guiding portion 900 and with the flow guiding portion 900. Meanwhile, label a in FIG. 10 is a cross-sectional structure view of the first via hole 901 when the flow guiding portion 900 is not provided, the first via hole 701 includes a side wall 711. Labels b and c in FIG. 10 respectively illustrate two flow guiding portions 900 symmetrically provided on the outside of the first via hole 701. The cross-section of the flow guiding portion 900 includes a first side and a second side 901. The first side is connected to the side wall 711 of the first via hole 701, the second side 901 is away from the side wall 711 of the first via hole 701, and the second side 901 is a beveled.

A depth of the flow guiding portion 900 is less than or equal to a thickness of the color resist layer 400. When the depth of the flow guiding portion 900 is equal to the thickness of the color resist layer 400, the structure is as shown in FIG. 10 with label b, and the second side 901 of the flow guiding portion 900 is a beveled. The beveled is directly connected to a bottom of the color resist 400, and the slope can be set as required. The depth of the flow guiding portion 900 is less than the thickness of the color resist layer 400, the structure is as shown in FIG. 10 with label c. At this time, the second side 901 of the flow guiding portion 900 is a beveled, a lower portion of the beveled is connected to the side wall 711, and the slope can also be set as required. In the present embodiment, a gentle-slope design is preferentially used, that is, the slope of the beveled is small, so that the alignment film 800 flows into the first via hole 701 more easily.

Figure 11:
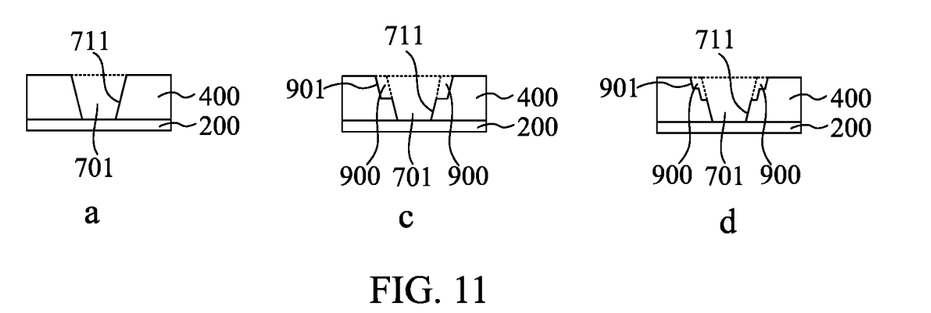
FIG. 11 is a second cross-sectional schematic diagram showing a comparison of an array substrate without a flow guiding portion and with a flow guiding portion according to an embodiment of the present application.

In an embodiment, as shown in FIG. 11, it is a second cross-sectional schematic diagram showing a comparison of the array substrate without the flow guiding portion 900 and with the flow guiding portion 900. Meanwhile, label a in FIG. 11 is a cross-sectional structure view of the first via hole 901 when the flow guiding portion 900 is not provided, the first via hole 701 includes a side wall 711. Labels b and c in FIG. 11 respectively illustrate two flow guiding portions 900 symmetrically provided on the outside of the first via hole 701. The cross-section of the flow guiding portion 900 includes a first side and a second side 901. The first side is connected to the side wall 711 of the first via hole 701, the second side 901 is away from the side wall 711 of the first via hole 701, and the second side 901 is a stepped structure.

As shown in FIG. 11 with label b, the second side 901 adopts a one-level stepped structure. The flow guiding portion 900 further includes a bottom side in the cross-sectional diagram. A lower portion of the second side 901 is connected to the side wall 711 of the first via hole 701 through the bottom side. As shown in FIG. 11 with label c, the second side 901 adopts a two-level stepped structure, and the principle is similar to label b in FIG. 11. The level number of the step and the depth of the step can be designed according to the depth of the first via hole 701 in the array substrate. In an embodiment, the depth of each step is 0.3 to 0.6 microns. When the level number of the step is more, the alignment film 800 is more likely to flow into the first via hole 701.

The present application also provides a liquid crystal display panel, including a first substrate and a second substrate arranged to a cell, and a liquid crystal filled between the first substrate and the second substrate, wherein the first substrate is an array substrate described in any of the above embodiments. The second substrate includes a first substrate, a black matrix, and a common electrode layer disposed in a stack. After the first substrate and the second substrate is celled, the liquid crystal is filled between them to form a color filter on array (COA) type liquid crystal display panel.

According to the above embodiments, it can be known that as follows.

The application provides an array substrate and a liquid crystal display panel, which the array substrate includes a substrate, a driving circuit layer, a color resist layer, and a pixel electrode layer. The driving circuit layer is formed on a side of the substrate. The color resist layer is formed on a side of the driving circuit layer away from the substrate, and a plurality of via holes are formed in the color resist layer. The pixel electrode layer is formed on a side of the color resist layer away from the driving circuit layer, and the pixel electrode layer is connected to the driving circuit layer through the via holes, wherein the via holes include at least one first via hole having an aperture diameter greater than a threshold value, the color resist layer is further formed with a plurality of flow guiding portions, each of the flow guiding portions is connected to at least part of the first via hole and positioned on at least one of an inside and an outside of the first via hole, the first via hole includes an aperture close to a side of the pixel electrode layer, each of the flow guiding portions includes a flow guiding surface flush with the aperture, and the flow guiding surface is connected to a part of an edge of the aperture. By providing the flow guiding portion, the flow guiding surface of the flow guiding portion is connected to the aperture of the first via hole, so that a shape of the aperture is changed. When the subsequent alignment liquid flows through the first via hole, a flow direction will be changed, which reduces the phenomenon that the alignment liquid bypasses the first via hole. Moreover, the additional pressure of the alignment liquid increases, so it does not accumulate around the first via hole, so that the film thickness of the alignment film on the array substrate is relatively uniform.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate, comprising:
   a substrate;
   a driving circuit layer formed on a side of the substrate;
   a color resist layer formed on a side of the driving circuit layer away from the substrate, and a plurality of via holes formed in the color resist layer; and
   a pixel electrode layer formed on a side of the color resist layer away from the driving circuit layer, and the pixel electrode layer connected to the driving circuit layer through the via holes;
   wherein the via holes include at least one first via hole having an aperture diameter greater than a threshold value and at least one second via hole having an aperture diameter equal to or less than the threshold value, the color resist layer is further formed with a plurality of flow guiding portions, each of the flow guiding portions is connected to at least part of the first via hole and positioned on at least one of an inside and an outside of the first via hole, the first via hole comprises an aperture close to a side of the pixel electrode layer, each of the flow guiding portions comprises a flow guiding surface flush with the aperture, and the flow guiding surface is connected to a part of an edge of the aperture, wherein each of the flow guiding portions is only connected to the first via hole, the threshold value is a critical dimension (CD) of an aperture diameter of the via holes, when the aperture diameter of the via holes is greater than the threshold value, an alignment liquid applied to the color resist layer bypasses the via holes, and when the aperture diameter of the via holes is not greater than the threshold value, the alignment liquid applied to the color resist layer flows into the via holes.

2. The array substrate according to claim 1, wherein the first via hole is connected to at least one of the flow guiding portions.

3. The array substrate according to claim 1, wherein one of the flow guiding portions is formed on the outside of the first via hole, and the flow guiding portion is groove.

4. The array substrate according to claim 1, wherein one of the flow guiding portions is formed on the inside of the first via hole, and the flow guiding portion is a solid structure.

5. The array substrate according to claim 4, wherein the solid structure is integrally formed with the color resist layer.

6. The array substrate according to claim 1, wherein each of the flow guiding portions comprises a first flow guiding portion formed on the outside of the first via hole and a second flow guiding portion formed on the inside of the first via hole, and the first guiding portion is a groove, and the second guiding portion is a solid structure.

7. The array substrate according to claim 6, wherein the solid structure is integrally formed with the color resist layer.

8. The array substrate according to claim 1, wherein a shape of the flow guiding surface comprises at least one of a triangle, a circular arc, a rectangle, or a trapezoid.

9. The array substrate according to claim 1, wherein a depth of each of the flow guiding portions is less than or equal to a thickness of the color resist layer.

10. The array substrate according to claim 1, wherein a cross section of the flow guiding portions comprises a first side edge and a second side edge, the first side edge is connected to a side wall of the first via hole, the second side edge is far away from the side wall of the first via hole, and the second side edge is a beveled or stepped structure.

11. A liquid crystal display panel, comprising a first substrate and a second substrate arranged to a cell, and a liquid crystal filled between the first substrate and the second substrate, the first substrate comprising:
   a substrate;
   a driving circuit layer formed on a side of the substrate;
   a color resist layer formed on a side of the driving circuit layer away from the substrate, and a plurality of via holes formed in the color resist layer; and
   a pixel electrode layer formed on a side of the color resist layer away from the driving circuit layer, and the pixel electrode layer connected to the driving circuit layer through the via holes;
   wherein the via holes include at least one first via hole having an aperture diameter greater than a threshold value and at least one second via hole having an aperture diameter equal to or less than the threshold value, and the color resist layer is further formed with a plurality of flow guiding portions, each of the flow guiding portions is connected to at least part of the first, via hole and positioned on at least one of an inside and an outside of the first via hole, the first via hole comprises an aperture close to a side of the pixel electrode layer, each of the flow guiding portions comprises a flow guiding surface flush with the aperture, and the flow guiding surface is connected to a part of an edge of the aperture, wherein each of the flow guiding portions is only connected to the first via hole, the threshold value is a critical dimension (CD) of an aperture diameter of the via holes, when the aperture diameter of the via holes is greater than the threshold value, an alignment liquid applied to the color resist layer bypasses the via holes, and when the aperture diameter of the via holes is not greater than the threshold value, the alignment liquid applied to the color resist layer flows into the via holes.

12. The liquid crystal display panel according to claim 1, wherein the first via hole is connected to at least one of the flow guiding portions.

13. The liquid crystal display panel according to claim 1, wherein one of the flow guiding portions is formed on the outside of the first via hole, and the flow guiding portion is groove.

14. The liquid crystal display panel according to claim 1, wherein one of the flow guiding portions is formed on the inside of the first via hole, and the flow guiding portion is a solid structure.

15. The liquid crystal display panel according to claim 14, wherein the solid structure is integrally formed with the color resist layer.

16. The liquid crystal display panel according to claim 1, wherein each of the flow guiding portions comprises a first flow guiding portion formed on the outside of the first via hole and a second flow guiding portion formed on the inside of the first via hole, and the first guiding portion is a groove, and the second guiding portion is a solid structure.

17. The liquid crystal display panel according to claim 16, wherein the solid structure is integrally formed with the color resist layer.

18. The liquid crystal display panel according to claim 1, wherein a shape of the flow guiding surface comprises at least one of a triangle, a circular arc, a rectangle, or a trapezoid.

19. The liquid crystal display panel according to claim 1, wherein a depth of each of the flow guiding portions is less than or equal to a thickness of the color resist layer.

20. The liquid crystal display panel according to claim 1, wherein a cross section of the flow guiding portions comprises a first side edge and a second side edge, the first side edge is connected to a side wall of the first via hole, the second side edge is far away from the side wall of the first via hole, and the second side edge is a beveled or stepped structure.

* * * * *